(12) United States Patent
Lentz et al.

(10) Patent No.: US 7,009,829 B2
(45) Date of Patent: Mar. 7, 2006

(54) SYSTEM, APPARATUS, AND METHOD FOR CONTROLLING LAMP OPERATION WHEN SUBJECT TO THERMAL CYCLING

(75) Inventors: Tracy L. Lentz, Minnetonka, MN (US); Timothy J. Kensok, Minnetonka, MN (US); Philip O. Readio, Savage, MN (US)

(73) Assignee: Honeywell International Inc., Morristown, NJ (US)

( * ) Notice: Subject to any disclaimer, the term of this patent is extended or adjusted under 35 U.S.C. 154(b) by 418 days.

(21) Appl. No.: 10/304,460

(22) Filed: Nov. 26, 2002

(65) Prior Publication Data

US 2004/0100749 A1 May 27, 2004

(51) Int. Cl.
*H02H 5/04* (2006.01)

(52) U.S. Cl. ............................................. 361/103
(58) Field of Classification Search ................ 361/100, 361/103, 93.7, 93.8; 315/106, 107, 100
See application file for complete search history.

(56) References Cited

U.S. PATENT DOCUMENTS

| | | | | |
|---|---|---|---|---|
| 3,814,991 | A | * | 6/1974 | Hewitt ........................ 361/198 |
| 4,042,855 | A | * | 8/1977 | Buenzli, Jr. .................. 315/219 |
| 4,396,872 | A | * | 8/1983 | Nutter ......................... 315/308 |
| 4,914,742 | A | | 4/1990 | Higashi et al. |
| 4,981,035 | A | | 1/1991 | Hall |
| 5,030,887 | A | * | 7/1991 | Guisinger .................... 315/158 |
| 5,107,687 | A | | 4/1992 | Candeloro |
| 5,200,156 | A | | 4/1993 | Wedekamp |
| 5,225,167 | A | | 7/1993 | Wetzel |
| 5,546,300 | A | * | 8/1996 | Lee et al. .................... 363/132 |
| 5,557,171 | A | * | 9/1996 | Marlor et al. ............... 313/636 |
| 5,601,619 | A | | 2/1997 | Drechsler |
| 5,635,133 | A | | 6/1997 | Glazman |
| 5,688,308 | A | | 11/1997 | Voights |
| 5,708,205 | A | | 1/1998 | Yamada et al. |
| 5,742,063 | A | | 4/1998 | Scroggins et al. |
| 5,754,036 | A | * | 5/1998 | Walker ........................ 323/237 |
| 5,755,103 | A | | 5/1998 | Na et al. |
| 5,914,572 | A | * | 6/1999 | Qian et al. ................... 315/307 |
| 5,935,525 | A | | 8/1999 | Lincoln et al. |
| 5,968,455 | A | | 10/1999 | Brickley |
| 6,022,511 | A | | 2/2000 | Matschke |
| 6,063,170 | A | | 5/2000 | Deibert |
| 6,245,131 | B1 | | 6/2001 | Rippelmeyer et al. |
| 6,264,802 | B1 | * | 7/2001 | Kamrukov et al. ......... 204/158.2 |

(Continued)

OTHER PUBLICATIONS

Honeywell Brochure, "Comfort, Energy & Health Solutions," 2 pgs, © Honeywell 2001.

(Continued)

*Primary Examiner*—Brian Sircus
*Assistant Examiner*—Z Kitov
(74) *Attorney, Agent, or Firm*—Gregory M. Ansems

(57) ABSTRACT

A system, apparatus, and method for preventing thermal cycling of a ballast coupled to one or more lamps. A monitor circuit is provided to monitor for activation of the ballast's thermal protection mechanism. Such monitoring may include monitoring of the ballast's thermal protection mechanism itself, or monitoring lamp current and ambient temperature in the vicinity of the ballast to determine that the ballast's thermal protection mechanism has been activated. Power to the ballast is temporarily disabled when the ballast's thermal protection mechanism has been activated, thereby preventing thermal cycling of the ballast, and consequently of the lamps, when power to the ballast has been removed.

43 Claims, 9 Drawing Sheets

U.S. PATENT DOCUMENTS 6,280,686 B1    8/2001  Scheir et al.
6,438,971 B1    8/2002  Lentz et al.
6,741,044 B1 *  5/2004  Komori et al. ............. 315/308
6,791,275 B1 *  9/2004  Shackle ...................... 315/129

OTHER PUBLICATIONS

Owner's Guide, "Enviracaire Elite—UV100E Ultraviolet Air Treatment Systems," 8 pgs, © Honeywell 2001.

* cited by examiner

SYSTEM, APPARATUS, AND METHOD FOR CONTROLLING LAMP OPERATION WHEN SUBJECT TO THERMAL CYCLING

FIELD OF THE INVENTION

This invention relates in general to ultraviolet (UV) lamp control, and more particularly to a system, apparatus, and method for preventing premature lamp mortality caused by thermal cycling resulting from high temperatures and thermal protection mechanisms provided in the ballasts that control the lamps.

BACKGROUND OF THE INVENTION

Ultraviolet (UV) and fluorescent lamps are used in a wide range of applications. For example, such lamps are used in medical, horticultural, and Heating, Ventilation and Air Conditioning (HVAC) settings, as well as the common and prolific use of fluorescent lamps as sources of visible light. In any of these and other diverse settings, the lamps may be subject to high ambient temperatures depending on their particular use. For instance, lamps may be used in garages, attics, or other specialized locations where ambient temperatures can reach very high levels.

Ballasts are used with UV and fluorescent lamps as a means for starting lamp operation by providing the requisite voltage to establish the arc that initially causes the lamp to turn on. More particularly, the ballast strikes an arc within a UV/fluorescent lamp at start-up by placing a high potential across the lamp's filaments. Ballasts often come equipped with mechanical thermal protection to shut down in high temperature conditions. For example, the internal thermal protection mechanism in a ballast may shut down ballast operation, thereby opening the circuit, where the ballast temperature reaches a certain cutout temperature of the protection mechanism. The ballast temperature will generally decrease when it is no longer conducting current, and the thermal protection mechanism will therefore allow the ballast to resume current conduction which allows the lamps to be powered on again. The ambient temperature may still be high however, causing the ballast temperature to quickly reach the cutout temperature and again shut down ballast operation. This thermal cycle can continue indefinitely, until the ambient temperature decreases sufficiently to break the cycle.

During this time, both the ballast and the lamps will repeatedly cycle between on and off, while providing less than useful lamp operating time. Moreover, this thermal cycling adversely affects the longevity of the lamp, as these types of products age the most during their start-up cycles. This is largely due to the physics underlying UV/fluorescent lamp operation. More specifically, UV and fluorescent lamps generally include a sealed glass tube that includes a small amount of mercury and an inert gas. The tube generally includes two electrodes or "filaments," one at each end of the tube, which are wired to an electrical circuit coupled to an alternating current (AC) power source. When the lamp is initially turned on, electricity heats up the filaments, which boils off electrons from the metal surface into the gas tube, which in turn ionizes the gas and creates an electrically conductive medium. At this point, the lamp's ballast provides the voltage kick across the filaments to establish an electrical arc through the gas. The resulting collision of free electrons with atoms releases other electrons, which creates ions, and ultimately plasma which establishes a path for an electrical current. Each time a lamp is turned on, the filament boils off electrons from its metal surface to ionize the gas and establish the arc, whereby a small amount of filament material actually evaporates. The number of start-ups that a lamp can undergo is thus limited before the filament ultimately burns out. Today's UV and fluorescent products are currently estimated to withstand approximately 4500 starts before failure. The thermal cycles caused by high ambient temperatures and the ballast's internal thermal protection mechanism cause an excessive number of lamp starts, which degenerates the integrity of the filament, ultimately leading to premature lamp mortality.

Accordingly, there is a need for a system and method for increasing lamp life that otherwise could be degraded due to thermal cycling resulting from high ambient temperatures and the internal thermal protection mechanisms provided by ballasts. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus and method for preventing thermal cycling of a ballast coupled to one or more lamps.

In accordance with one embodiment of the invention, a method is provided for preventing thermal cycling of a ballast coupled to one or more lamps. The method includes monitoring for activation of the ballast's thermal protection mechanism. Power to the ballast is disabled when the ballast's thermal protection mechanism has been activated.

In more particular embodiments of such a method, monitoring for ballast thermal protection activation includes determining whether current is flowing through the ballast and/or lamps, monitoring the ambient temperature proximate the ballast, and comparing the ambient temperature to a predetermined temperature threshold. In one embodiment, the ballast's thermal protection mechanism is deemed activated when it is determined that current is not flowing through the ballast/lamp(s), and when the ambient temperature is greater than the predetermined temperature threshold.

In other particular embodiments of such a method, disabling power to the ballast involves disabling power to the ballast until at least one predetermined event occurs. In one embodiment, the ambient temperature is monitored in response to the occurrence of the predetermined event(s), and the power continues to be disabled if the ambient temperature is, for example, still greater than the predetermined temperature threshold or has not decreased by a predetermined amount. In other embodiments, the power is restored to the ballast if, for example, the ambient temperature is no longer greater than the predetermined temperature threshold or has decreased by a predetermined amount. In still another embodiment, the ambient temperature in the vicinity of the ballast is repeatedly monitored in response to repeated occurrences of second predetermined events, power is restored to the ballast if the ambient temperature corresponds to a predetermined ambient temperature condition in response to any of the occurrences of the second predetermined events, and power to the ballast continues to be disabled if the ambient temperature fails to correspond to the predetermined ambient temperature condition in response to any of the occurrences of the second predetermined events.

In still other particular embodiments of such a method, monitoring for activation of the ballast's thermal protection mechanism includes monitoring for a signal generated by the ballast in response to the ballast's thermal protection mechanism being activated. In another embodiment, monitoring for activation of the ballast's thermal protection mechanism includes monitoring the ballast's thermal protection mechanism itself, to determine when the ballast's thermal protection mechanism has been activated.

In accordance with another embodiment of the invention, a control system is provided for preventing thermal cycling of a ballast coupled to at least one lamp, where the ballast includes a thermal protection mechanism to disable power to the lamp while the thermal protection mechanism is activated. The control system includes a current monitor coupled to monitor current flow through the ballast to the lamp, and to provide an indication of a state of the current flow. At least one temperature sensor is positioned within a predetermined vicinity of the ballast to measure an ambient temperature proximate the ballast. A controller is coupled to the current monitor and the temperature sensor to determine whether the ballast's thermal protection mechanism is activated based on the indication of the state of current flow and the ambient temperature, and to disable power to the ballast when it is determined that the ballast's thermal protection mechanism is activated.

In a more particular embodiment of such a control system, the controller includes a data processing module configured to compare the ambient temperature to a predetermined temperature threshold, and to determine when the ballast's thermal protection mechanism is activated by determining when the indication of the state of current flow indicates a lack of current flow, and when the ambient temperature is greater than the predetermined temperature threshold.

In other particular embodiments of such a control system, the controller includes at least one timer, where the controller is configured to restore power to the ballast upon expiration of the timer. In another embodiment, the controller includes at least one timer, where the controller is configured to determine whether an ambient temperature condition is met upon expiration of the timer. In such an embodiment, the controller may be configured to continue to disable power to the ballast if the ambient temperature condition is not met. The controller may include a second timer, where the controller is configured to restore power to the ballast upon expiration of the second timer, or to again determine whether the ambient temperature condition is met upon expiration of the second timer.

In accordance with another embodiment of the invention, an ultraviolet (UV) air treatment system for treating air provided by an air handling system is provided. The air handling system includes an air duct arrangement for channeling the air through a targeted space. The UV air treatment system includes at least one UV lamp positionable within the air duct arrangement. A ballast is coupled between a power source and the UV lamp, where the ballast includes a thermal protection mechanism to disable power to the lamp while the thermal protection mechanism is activated. A current monitor is coupled such that it monitors current flow through the ballast to the UV lamp, and provides an indication of a state of the current flow. At least one temperature sensor positioned within a predetermined vicinity of the ballast is provided, to measure an ambient temperature proximate the ballast. A controller is coupled to the current monitor and to the temperature sensor, to determine whether the ballast's thermal protection mechanism is activated, which is based on the indication of the state of current flow and the ambient temperature. The controller disables power to the ballast when it is determined that the ballast's thermal protection mechanism is activated.

In more particular embodiments of such a system, the controller includes a data processing module to compare the ambient temperature to a predetermined temperature threshold. The controller determines when the ballast's thermal protection mechanism is activated by determining when the indication of the state of current flow indicates a lack of current flow, and when the ambient temperature is greater than the predetermined temperature threshold.

BRIEF DESCRIPTION OF THE DRAWINGS

The invention is described in connection with the embodiments illustrated in the following diagrams.

DETAILED DESCRIPTION OF THE INVENTION

Figure 1:
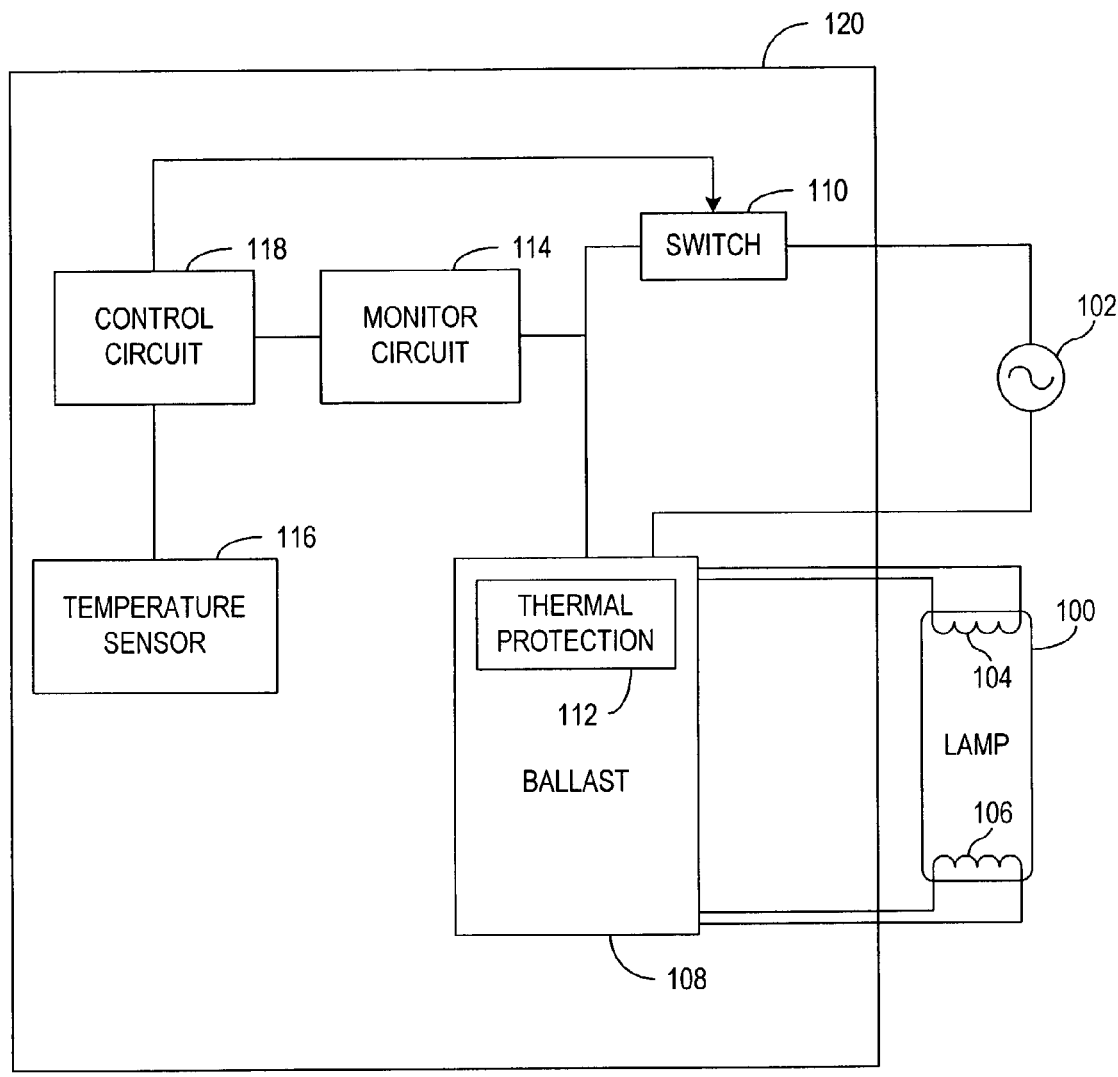
FIG. 1 is a block diagram of one embodiment of a lamp thermal cycle detection system in accordance with the present invention.

In the following description, reference is made to the accompanying drawings which form a part hereof, and in which is shown by way of illustration particular embodiments in which the invention may be practiced. It is to be understood that other embodiments may be utilized, as structural and operational changes may be made without departing from the scope of the present invention.

Devices such as UV and fluorescent lamps, or products incorporating such lamps, are often intended for use in spaces that experience high ambient temperatures. For example, UV and fluorescent lamps may be used in attics, garages, or special environments where ambient temperatures can reach levels well above outside ambient temperatures or temperatures in a controlled environment. Products may be subject to specifications or regulations requiring operation as high as 170 degrees Fahrenheit or higher. These lamps and/or associated components are susceptible to early mortality when subject to such conditions.

In order to address this problem, some components such as ballasts, may incorporate internal protection mechanisms. More specifically, ballasts that control the lamps often incorporate mechanical thermal protection to shut down in high temperature conditions. For example, the internal thermal protection mechanism in a ballast may shut down ballast operation, thereby opening the circuit, where the ballast temperature reaches a certain cutout temperature. The ballast temperature will generally decrease when it is no longer conducting current, and the thermal protection mechanism will therefore allow the ballast to resume current conduction. The lamps will again be powered on. The ambient temperature may still be high however, causing the ballast temperature to quickly reach the cutout temperature and again shut down ballast operation. This thermal cycle can continue indefinitely, until the ambient temperature decreases sufficiently to break the cycle. During this time, both the ballast and the lamps will repeatedly cycle between on and off, while providing less than useful lamp operating time. Moreover, this thermal cycling detrimentally affects the longevity of the lamp, as these types of products age the most during their start-up cycles. More particularly, the ballast strikes an arc within a UV/fluorescent lamp at start-up by placing a high potential across the lamp's filaments. Each time this occurs, a small amount of filament material actually evaporates. The number of start-ups that a lamp can undergo is thus limited before the filament ultimately burns out. Therefore, the thermal cycles caused by high ambient temperatures and the ballast's internal thermal protection mechanism can lead to premature lamp mortality.

The present invention addresses such issues, and can significantly increase operational lamp longevity. The present invention generally provides a manner of preventing thermal cycling of a ballast coupled to one or more lamps, which includes monitoring for activation of the ballast's thermal protection mechanism, and temporarily disabling power to the ballast when the ballast's thermal protection mechanism has been activated.

FIG. 1 is a block diagram of one embodiment of a lamp thermal cycle detection system in accordance with the present invention. One or more lamps 100 are powered by an AC power source 102. The AC power source 102 is provided by, for example, a utility company, an AC power generator, or the like. The UV lamp 100 can assume a variety of forms, such as a low pressure mercury lamp. The lamp 100 includes electrodes, shown as filaments 104, 106, between which current flows through the lamp 100. The ballast 108 is coupled to the AC power source 102 and the lamp(s) 100, and is used to provide the requisite voltage to establish the arc that initially causes the lamp 100 to turn on. The ballast 108 may be any known type of ballast, such as a magnetic or electronic ballast. Under normal operating conditions, a switch 110 can be turned on, establishing an electrical circuit path from the power source 102 through the switch 110, the ballast 108, and the lamp 100.

As described above, the ballast 108 used in connection with UV and fluorescent lamps may include a thermal protection mechanism 112. The thermal protection mechanism 112 may shut down ballast 108 operation, thereby opening the circuit, where the ballast temperature reaches a certain temperature. Particularly where the ambient temperature is high, excessive thermal cycling can occur as described above. In one embodiment, the present invention solves this problem utilizing, for example, the monitor circuit 114, temperature sensor 116, and control circuit 118.

The solution of the present invention first includes determining whether current is flowing through the lamp 100. This can be determined in a number of ways, including directly measuring the current flowing through the lamp 100 or ballast 108, measuring an auxiliary current derived from current flowing through the lamp 100 or ballast 108, or any other alternate current measuring technique. The monitor circuit 114 represents the circuit that performs this monitoring function. The manner in which the monitor circuit 114 is coupled to the ballast 108 and/or the lamp(s) 100 depends on the particular type of monitoring to be performed. In the case where direct lamp current measurements are obtained, for example, by an electronic current meter, the monitor circuit 114 may be electrically coupled in series with the ballast 108 and lamp 100. The monitor circuit 114 may also be coupled in parallel with the circuit providing voltage/current to the lamp 100, where an auxiliary current derived from the lamp current is used for the current measurement. Thus, while the monitor circuit 114 is illustrated in FIG. 1 as being in parallel with the ballast 108 and lamp 100, this need not be the case, as the particular monitoring methodology employed will govern the manner in which it is connected.

In addition to measuring whether current is flowing through the lamp(s) 100, a temperature reading is obtained. The ambient temperature of the device 120 or area in which the ballast 108 resides is obtained. For example, the ballast 108 and other circuitry may be provided in a common housing, and the temperature within that housing may be used to help determine whether a lack of lamp current flow is due to activation of the ballast's 108 thermal protection mechanism 112. The internal device/area temperature can be determined using a temperature sensor 116, such as a thermocouple, thermistor, wire resistance temperature detector (wire RTD), integrated circuit (IC) sensor, etc.

In one embodiment of the invention, if a loss of current through the lamp(s) 100 is detected, and if the internal temperature as measured by the temperature sensor 116 is greater than a predetermined temperature limit, it may be assumed that the ballast thermal protection mechanism 112 has shut down the lamp(s) 100. Based on this supposition, the control circuit 118 can be configured to process the monitor circuit 114 output and the ambient temperature provided by the temperature sensor 116 to arrive at a conclusion whether the thermal protection mechanism 112 caused the suspension of current flow through the lamp(s) 100. When the control circuit 118 makes such a determination, it can temporarily disable power to the ballast 108 and/or lamp(s) 100 to prevent subsequent thermal cycling caused by the high ambient temperature and the thermal protection mechanism 112 of the ballast 108. In one embodiment of the invention, the control circuit controls a relay or switch 110, and opens the switch 110 to prevent thermal cycling for a certain period of time or until a particular event occurs. Mechanisms other than controlling a relay/switch 110 may be used to temporarily prohibit ballast 108 and lamp 100 operation. For example, electronic ballasts may include an enable input to receive a signal indicative of whether the ballast is to internally complete the circuit. Therefore, the control circuit 118 can provide an electronic control signal to such a ballast to temporarily suspend further ballast/lamp operation. It should be recognized, therefore, that references made herein to controlling a switch 110 are intended to include any manner of directly or indirectly controlling power to the ballast and/or lamp(s).

Figure 2:
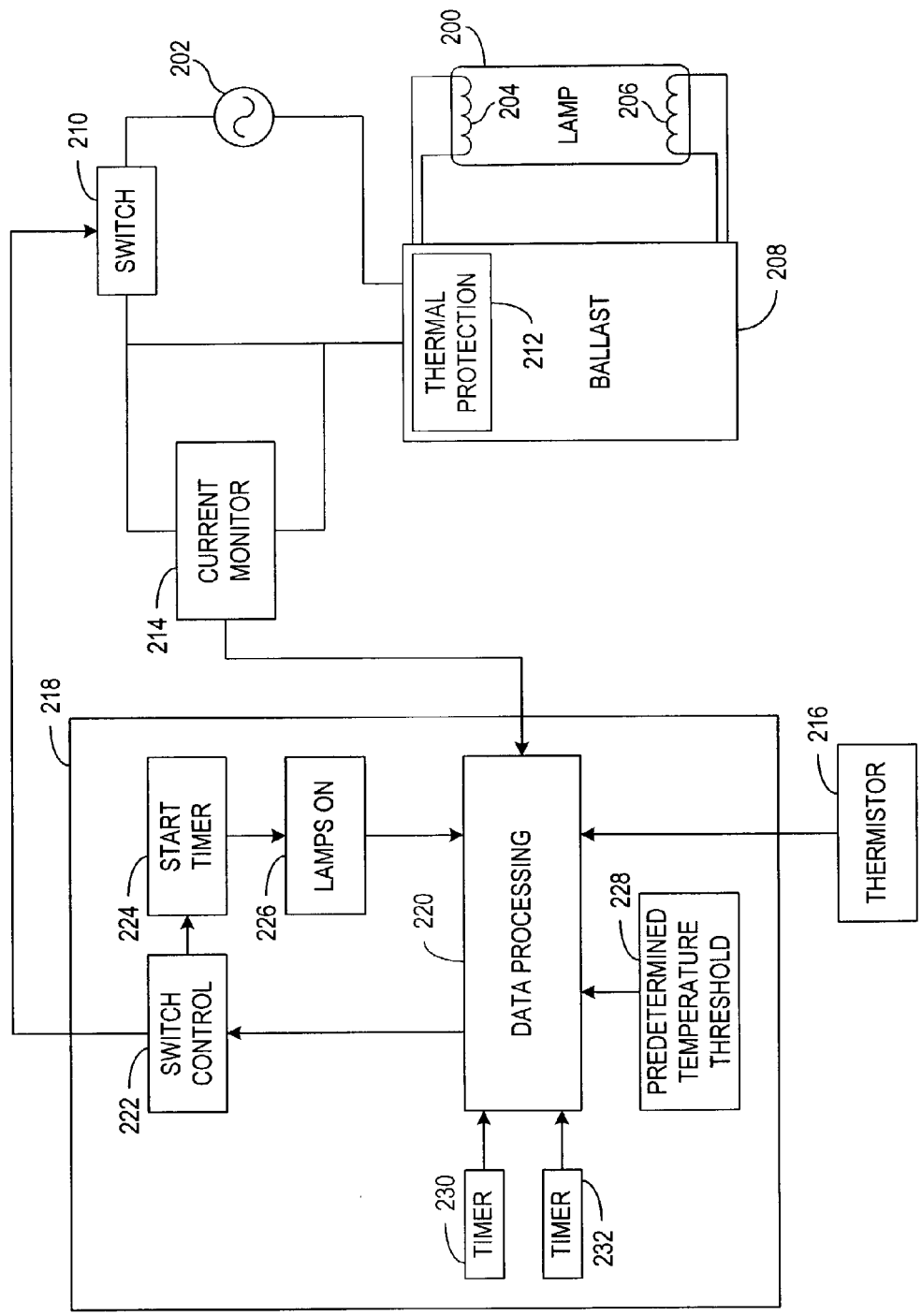
FIG. 2 is a block diagram of a more particular embodiment of a lamp thermal cycle detection system in accordance with the present invention.

FIG. 2 is a block diagram of a more particular embodiment of a lamp thermal cycle detection system in accordance with the present invention. One or more UV lamps 200 are provided, which are powered by an AC power source 202. Closing switch 210 establishes an electrical circuit including the voltage source 202, switch 210, ballast 208, and lamp(s) 200. During periods of high ambient temperatures, the thermal protection mechanism 212 can cause thermal cycling as described above. Such thermal cycling can result in numerous start-ups of the lamp(s) 200, which reduces the life expectancy of the lamp(s) 200.

In accordance with one embodiment of the invention, a current monitor 214 is used to determine whether current is flowing through the lamp 200. While any desired manner of monitoring lamp 200 current may be utilized in accordance with the present invention, a representative example is subsequently described in connection with FIG. 4, and is described generally here. This embodiment involves monitoring for "zero crossings" of the current entering the ballast 208. Monitoring for zero crossings provides an indication of whether current is properly flowing between the filaments 204, 206 of the lamp 200. In one embodiment, the current monitor 214 monitors for zero crossings in a standard 60 Hz AC source signal, where the zero crossings occur 120 times per second. However, the current monitor 214 may be used with any particular source signal frequency. For example, many European countries operate on a 50 Hz source signal frequency, and in such a case, the current monitor 214 monitors for zero crossings 100 times per second.

Assuming a 60 Hz signal for purposes of discussion, current can be deemed to be flowing properly between the filaments 204, 206 if the current is flowing in each of the 120 time intervals occurring each second. When current is not flowing between the filaments 204, 208 as determined by the current monitor 214 and the control circuit 218, a number of reasons are possible. For example, the power source 202 may have failed, the switch 210 may be defective, or the thermal protection mechanism 212 within the ballast 208 may have triggered and removed power to the lamp 200 due to high ballast 208 temperature. In accordance with the present invention, ambient temperature within the product, device, or area in which the ballast 208 resides can be measured by the thermistor 216. The control circuit 218 can then deduce from the current and temperature measurements whether the lamp current failure is likely due to activation of the thermal protection mechanism 212.

The control circuit 218 shown in FIG. 2 may be implemented in a variety of manners. In the illustrated embodiment, the control circuit 218 may be implemented using a microprocessor, microcontroller, or other processing arrangement where at least some of the functions are controlled using a software program(s). In other embodiments, discrete hardware components may be implemented, or a combination of discrete and software-based circuitry. The control circuit 218 may include, for example, a data processing module 220. For example, the data processing module 220 may represent a microprocessor or microcontroller that performs functions as dictated by one or more programs, and associated memory to temporarily and/or permanently store information during such processing.

Initially, the data processing module 220 may be used to close a relay or other switching mechanism, such as switch 210, in order to initially provide power to the lamp(s) 200. More particularly, an input may be provided to the control circuit 218 indicating that power to the lamp(s) 200 is desired. Such an input may be provided via a user interface (not shown) to the control circuit 218, such as a button, switch, touch screen, voice command, or other user interface mechanism. This input is recognized by the data processing module 220, which in turn closes the switch 210 by way of the switch control 222. This switch control 222 may take on various forms. For example, the switch control 222 may simply represent a register storing appropriate data to provide as a signal to an electronic switch 210 to turn on the switch 210. Alternatively, the switch control 222 may represent a driver circuit to drive a signal to a relay or other switch 210 to turn on the switch. Thus, the switch control 222 represents any switch control mechanism used to control the operation of a relay, switch, or other mechanism controlling the power to the ballast 208 and lamp 200.

When the switch 210 or other power-enabling mechanism is initially turned on and power is provided to the lamp 200 in response thereto, a predetermined time period may be established to allow the lamp(s) 200 to properly start. For example, once the switch 210 has been turned on, a start timer 224 may be started, where such a timer 224 may be implemented in hardware, software, or a combination thereof. In one embodiment, the start timer 224 is implemented in software operable on a processing device. The start timer 224 sets a register, flag, memory location, or other indication that the lamp(s) are "ON," as depicted by the LAMPS ON block 226, upon expiration of the predetermined timer 224 period. For example, this time period may be on the order of a number of seconds, such as three seconds, five seconds, forty seconds, or other predetermined time in which proper lamp 200 operation is expected after power has been applied. During this time, the ballast 208 will be connected to the power source 202 via the switch 210, the filament will heat up, strike the arc, and current will begin to flow through the gas between the filaments 204, 206 of the lamp(s) 200. At the expiration of the start timer 224, it is expected that current is properly flowing through the lamp(s) 200, and the LAMPS ON 226 indicator will be set.

The data processing module 220 receives information from the current monitor 214 indicative of the state of the current flow through the lamp(s) 200. In one embodiment of the invention, the current monitor 214 identifies whether current is properly flowing through the lamp 200 during a predetermined number of time intervals separated by zero crossings of the time-varying current signal. This embodiment assumes a standard current signal having both positive and negative amplitudes which has such zero crossings; however any current/voltage level may be selected as the reference points. For example, a time-varying current signal may be shifted such that the current signal is always positive, in which case zero crossings may not be the reference point but rather a predetermined amplitude greater than zero may be selected (e.g., an amplitude substantially centered about the peaks of the time-varying signal).

In an exemplary embodiment, processing of data provided by the current monitor 214 will not occur until (and unless) the LAMPS ON 226 indicator is set. The data processing module 220 processes this information, and determines whether the number of time intervals in which current is not properly flowing has reached the predetermined number of such time intervals. In one embodiment, if three consecutive time intervals indicate a lack of properly flowing current through the lamp(s) 200 (e.g., approximately 25 ms for a 60 Hz voltage signal), the data processing module 220 will not know whether the lack of current flow is due to a power source 202 problem, a failed switch 210, activation of the thermal protection mechanism 212, etc.

Thus, in accordance with the present invention, the internal device or area temperature is sensed by thermistor 216, and provided to the data processing module 220. Given this information and the current measurement information from the current monitor 214, the data processing module 220 can reasonably deduce whether or not the lack of lamp current flow is due to activation of the thermal protection mechanism 212. More particularly, when the data processing module 220 receives information from the current monitor 214 and determines that no lamp current is flowing, a predetermined temperature threshold 228 is compared to the temperature sensed by the thermistor 216. If the temperature sensed by the thermistor 216 is greater than the predetermined temperature threshold 228 as determined by the data processing module 220, it is assumed that the ballast 208 thermal protection mechanism 212 was responsible for terminating current flow through the lamp(s) 200. Therefore, to prevent the thermal cycling problems identified above, the data processing module 220 and associated switch control 222 provide a signal to turn off the switch 210, at least temporarily, to avoid damage to the lamp(s) 200 during this time of high device temperature.

After a predetermined time in which the power has been removed from the ballast 208 and lamp(s) 200, power may again be restored to the lamps 200. As an example, a first timer 230 may be initiated when the data processing module 220 and associated switch control 222 have disabled power by turning off the switch 210. The first timer can be set to any desired time, such as three hours for example. At the expiration of the time associated with the timer 230, power can be restored by turning on switch 210, and it can again be determined whether the thermal protection mechanism 212 has been reset to allow lamp current flow to resume.

It is noted that other predetermined events other than expiration of a predetermined time duration may also be used in accordance with the present invention. For example, one or more particular times of the day may be used (e.g., 12:00, 3:00, 6:00, etc.), such that restoring power to the ballast and lamps occur at these specified times. In another example, expiration of a predetermined count value may be employed, such as expiration of a decrementing counter having a particular binary value. In still another example, an event such as the receipt of a particular signal may trigger restoring power to the ballast and lamp, such as recognition of a fan signal indicating that convection cooling has been initiated, or recognition of any other signal that may be relevant to the ballast temperature.

If it is determined that the ballast thermal cycle is still in progress after the predetermined time has elapsed or other predetermined event has occurred, additional temporary power removal cycles may be effected. For example, a second timer 232 (or alternatively the same timer 230) may be initiated if the ballast thermal cycle is still in progress. The second timer can be set to any desired time, such as one hour for example. This process can repeat as many times as is desired or necessary, using one or more timers or event triggers. It should be noted that the timers, such as timers 230, 232, may be implemented using software operable on a microcontroller/microprocessor or other processing device, using discrete electronic components such as frequency dividers or other counters, using analog timing circuits such as resistor/capacitor (RC) delay circuitry, or any other known timing mechanism. More particular examples of representative power removal and restoration operations are described more fully below.

Figure 3:
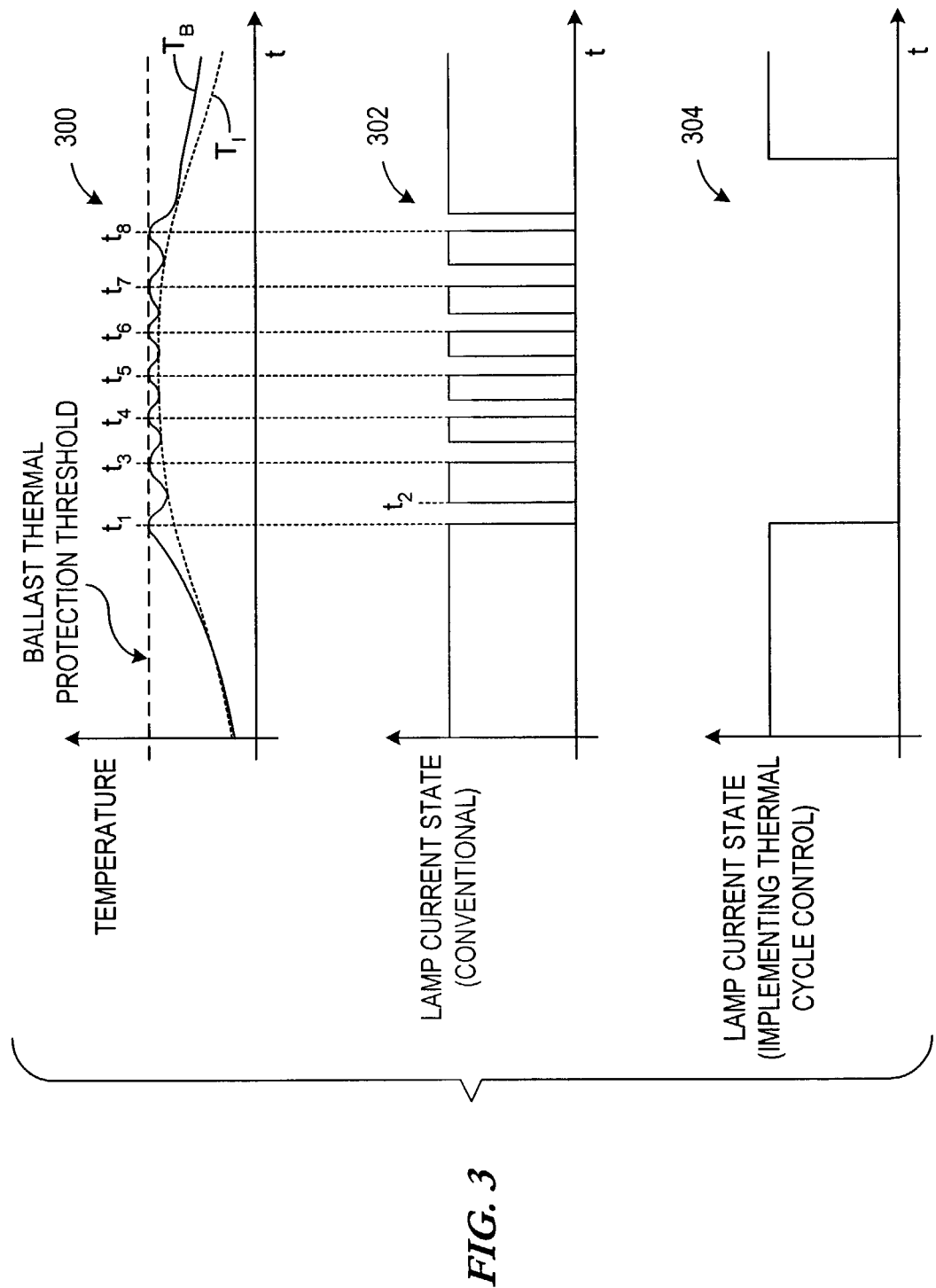
FIG. 3 is a diagram illustrating the manner in which the present invention can provide protection from potential ballast thermal cycling.

The present invention prevents the potential ballast thermal cycling from repeatedly turning the lamps on and off, which can severely impact the life expectancy of the lamps. FIG. 3 is a diagram illustrating the manner in which the present invention can provide this protection. As shown in FIG. 3, a ballast temperature $T_B$ and an internal (device) temperature $T_I$ are shown on temperature graph 300. As the internal temperature $T_I$ increases, so does the ballast temperature $T_B$ due to the rise of ambient temperature in the vicinity of the ballast. Further, the ballast itself will generate heat as a result of its operation, thereby generally causing the ballast temperature $T_B$ to further increase. The ballast includes an internal thermal protection mechanism having an associated ballast thermal protection threshold at which the protection mechanism will trigger. When the protection mechanism triggers, no further current is allowed to pass through the ballast and lamp(s) until the protection mechanism resets due to a temperature decrease. As shown on the temperature graph 300, the ballast temperature $T_B$ reaches the ballast thermal protection threshold at a first time $t_1$, at which time the ballast thermal protection mechanism triggers, causing the lamp current to stop flowing as shown in graph 302. It is noted that the graphs 302 and 304 represent the on/off state of current flow, rather than a representation of the actual current signal.

In a conventional system that does not employ the principles of the present invention, the state of the lamp current can repeatedly turn on and off, as illustrated by graph 302. More particularly, the ballast temperature $T_B$ begins to decrease towards the internal temperature $T_I$ after time $t_1$, due to the fact that it is no longer conducting current. At some point, the ballast thermal protection mechanism will reset, again allowing current to flow, as depicted at time $t_2$. The ballast will resume conducting current, and the lamp will again turn on. However, the ballast temperature $T_B$ will again rise, and if the internal temperature $T_I$ has not decreased, the ballast temperature may again reach the ballast thermal protection threshold as shown at times t3 through t8. Each time the ballast temperature $T_B$ reaches the ballast thermal protection threshold, lamp current will be suspended. Therefore, the lamp current will toggle on and off due to the ballast thermal cycling, as shown in graph 302.

Implementing a thermal cycle control system in accordance with the present invention provides for a different result, as shown in graph 304. In accordance with the invention, the lack of lamp current flow due to ballast operation will be detected, and the power to the ballast will be temporarily disconnected. This will prevent the lamps from turning on and off for a predetermined time or until a predetermined event occurs, even if the ballast thermal protection mechanism would otherwise allow current flow to resume. As can be seen from graph 304, the present invention prevents the repeated lamp start-ups that may otherwise occur in conventional systems as depicted in graph 302, thereby protecting against premature lamp mortality.

Figure 4:
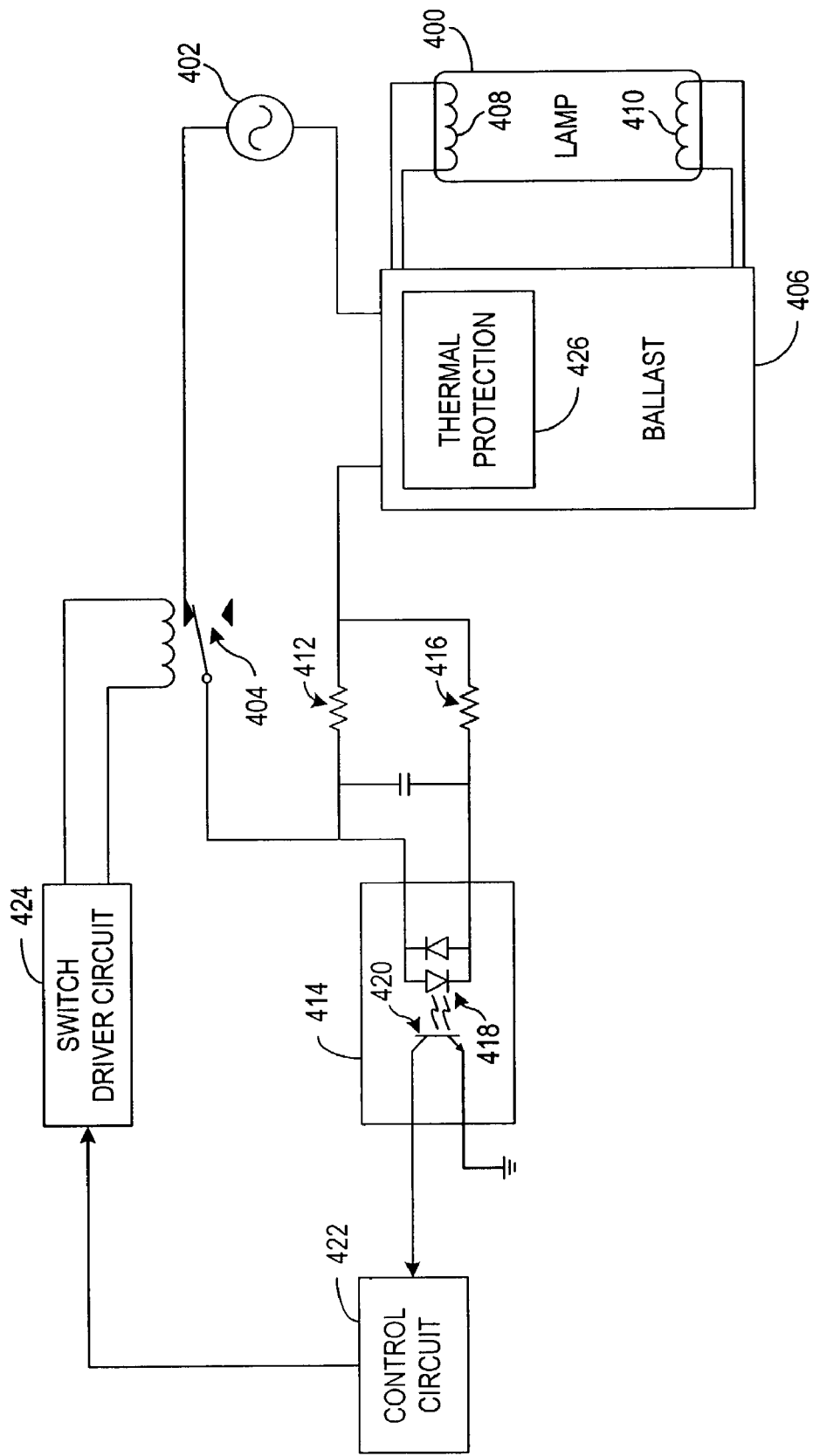
FIG. 4 is a schematic diagram of one embodiment of a current monitor circuit used to determine whether current is flowing through the ballast and/or lamps.

As previously indicated, the present invention makes a determination as to whether the lamps are on, such as by monitoring the current through the ballast and/or lamps. A number of different current and/or voltage monitoring schemes may be used to determine whether current is flowing in the ballast and lamps. One embodiment of a current monitoring implementation is illustrated in FIG. 4. FIG. 4 is a schematic diagram of one embodiment of a current monitor circuit used to determine whether current is flowing, which can then be used in conjunction with the device internal temperature to determine whether a ballast thermal cycling condition is present. Again, one or more UV or fluorescent lamps 400 are provided, which are powered by an AC power source 402. In the illustrated embodiment, closing relay 404 establishes an electrical circuit to allow current flow from the power source 402 through the relay 404, resistance 412, ballast 406, and filaments 408, 410 of the lamp(s) 400.

In the illustrated embodiment, ballast and lamp current may be monitored for a single lamp 400, or for a plurality of lamps 400. Where multiple lamps 400 are utilized, additional circuitry may be provided to monitor the current through those lamps. For purposes of discussion, the circuit of FIG. 4 one lamp 400 is assumed. In the illustrated embodiment, one side of the relay 404 is coupled to a series resistance, illustrated as resistor 412, which is in turn coupled to the ballast 406. The relay 404 is also coupled to an opto-isolator circuit 414, through another resistor 416, which is in turn also coupled to the ballast 406. In one embodiment of the invention, resistor 416 is significantly larger than parallel resistor 412, so that most of the current flows through resistor 412, but a portion of the current flows through the opto-isolator 414 and resistor 416 to monitor the current. For example, resistor 412 is approximately 3.3 ohms and resistor 416 is approximately 68 ohms in one embodiment of the invention. The resistances may be provided in any desired manner, such as using one or more resistor components, transistor-based resistances such as voltage-controlled resistors, and the like.

When the relay 404 is on, most of the current (based largely on the voltage division created by the parallel resistances 412, 416) flows through resistor 412. However, a small portion of the current flows through the opto-isolator 414 diodes 418 and through resistor 416 to the ballast 406. When the current is at or above a predetermined level, the opto-isolator diodes 418 will turn on. A photo-transistor 420 senses when the diodes 418 are conducting current. Using a pull-up resistance (not shown) at the collector of the phototransistor 420, the control circuit 422 can sense when a sufficient quantity of current is flowing in the ballast 406 and ultimately in the lamp 400. Thus, the opto-isolator 414 turns on during one half of a current cycle of sufficient quantity, turns off during the zero crossing, and turns on again for the next half current cycle of sufficient quantity. This creates a pulse signal at the output of the opto-isolator 414 that pulses 120 times per second for a 60 Hz signal.

The control circuit 422 recognizes the pulses, and can determine whether current is flowing through the ballast 406 and lamp 400 during each of these half cycles. If a pulse is missing, it indicates that the current through resistance 416 (and accordingly through resistance 412, the ballast 406, and the lamp 400) is insufficient or nonexistent, which may ultimately indicate that the thermal protection mechanism 426 has open-circuited the current path. If a predetermined number of such pulses are missing, the control circuit 422 provides a signal to the switch driver circuit 424 to switch the relay 404 to the off position, thereby removing power from the lamp 400. In one embodiment of the invention, three consecutive missing pulses are recognized by the control circuit 422 as a lack of current flow, which triggers the switch driver circuit 424 to switch the relay 404 to the off position. This will turn off the lamp 400, thereby protecting the lamp 400 from the potentially damaging effects of a ballast thermal cycling condition.

Power can be restored to the lamp 400 after a predetermined time or in connection with a predetermined event, and in one embodiment can cycle between applying power and disabling power to the lamps. This essentially suspends power to the lamps during periods when ballast thermal cycling may be occurring, and restores power when such thermal cycling has possibly concluded. The suspension and restoration of power to the ballast 406 as dictated by the control circuit 422 can continue indefinitely, for a predetermined time, or until a predetermined event(s) has occurred, as is described more fully below.

Figure 5:
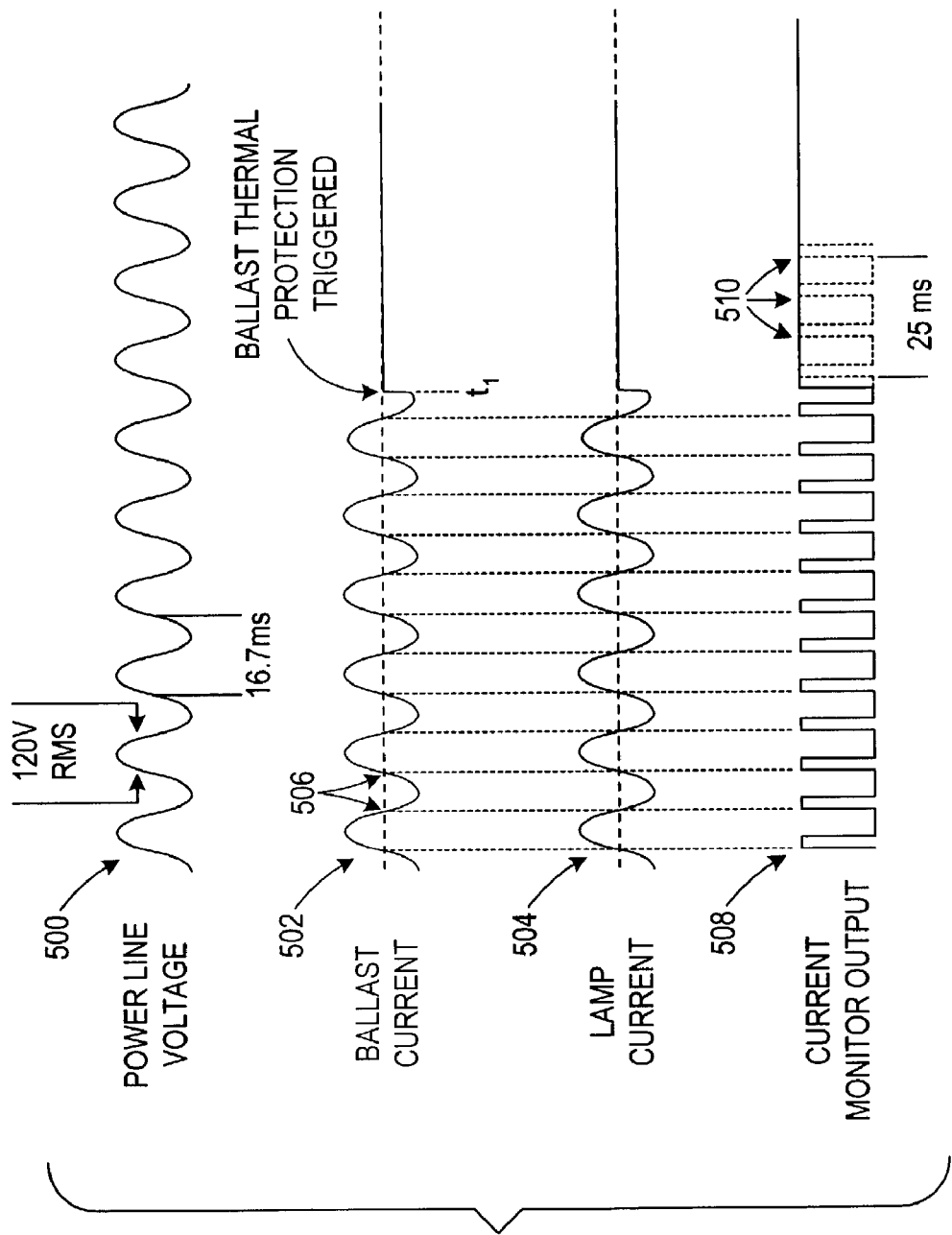
FIG. 5 is a timing diagram generally illustrating an example of the signals associated with the current monitor circuit of FIG. 4.

FIG. 5 is a timing diagram generally illustrating an example of the signals associated with a current monitor circuit such as that described in connection with FIG. 4. The illustrated power line voltage 500 is represented by a sinusoidal voltage signal having a frequency of approximately 60 Hz, and exhibiting approximately 120V RMS. Based on the power source signal 500, the ballast current 502 and lamp current 504 are provided (possible phase deviations due to inductive and/or capacitive effects are disregarded for purposes of this discussion). The current monitor circuit discussed in connection with FIG. 4 monitors the zero crossings of the ballast current 502 (or alternatively the lamp current 504), as depicted by representative zero crossings 506. A pulse may be generated at each zero crossing, as illustrated by the current monitor output 508.

At a given time, the ballast thermal protection mechanism may trigger, as depicted at time $t_1$. This will discontinue ballast current 502 flow, as well as lamp current 504 flow. The current monitor circuit will recognize the suspension of ballast/current flow, and will stop generating pulses at the current monitor output 508. More particularly, the opto-isolator associated with the current monitor of FIG. 4 will stop generating pulses, as zero crossings will stop occurring. In one embodiment, if three consecutive pulses 510 are not recognized such that no proper ballast current 502 and/or lamp current 504 is present for a corresponding amount of time (approximately 25 ms in this example), the control circuit will cause the switch/relay to open, thereby removing power from the ballast and lamp. It should be recognized that any number of consecutive or non-consecutive unrecognized pulses, including one, may be selected as the criteria for temporarily disabling power to the lamps.

Other current sensing mechanisms may be employed in accordance with the present invention. For example, an electronic current meter may also be employed which directly monitors the current through the ballast and/or lamp. Any presently known or future current monitoring technique may be used in accordance with the present invention, where such current monitoring technique provides an indication to the processing module (e.g., microprocessor, microcontroller, other software-operable processing device, discrete component processor, etc.) as to when the lamp is conducting current.

Furthermore, techniques other than directly monitoring for current flow may also be used in accordance with the present invention. For example, a ballast may include an output to provide a signal indicating that it has triggered its internal thermal protection mechanism and has therefore opened the circuit to the lamp(s). Such a signal may be directly monitored by the processing module, and the power to the ballast can be controlled depending on the state of this ballast signal. More particularly, the monitor circuit may be implemented as a separate monitor circuit to monitor for such a signal, or the monitor circuit may be implemented integral to the processing module, such as by a software polling or interrupt routine in a microprocessor/microcontroller implementation. Alternatively, where accessible, the thermal protection mechanism in the ballast may be directly monitored in lieu of (or in addition to) monitoring current flow through the ballast/lamp. For example, one or more conductors may be coupled to the ballast's thermal protection mechanism and/or associated circuitry to determine the state of the thermal protection mechanism. A resulting signal transmitted by the conductor(s) may be provided to the processing module for analysis, and power to the ballast can be controlled in response thereto. Thus, in accordance with one aspect of the invention, any indication that the ballast's thermal protection mechanism has been triggered may be utilized to initiate the power interruption mechanism according to the present invention. In other words, monitoring current, monitoring the ballast's thermal protection unit, monitoring a signal provided by the ballast indicating activation of the thermal protection unit, or other indication may be used in connection with the internal/ambient temperature reading to initiate the thermal cycle prevention methodologies according to the present invention.

Figure 6:
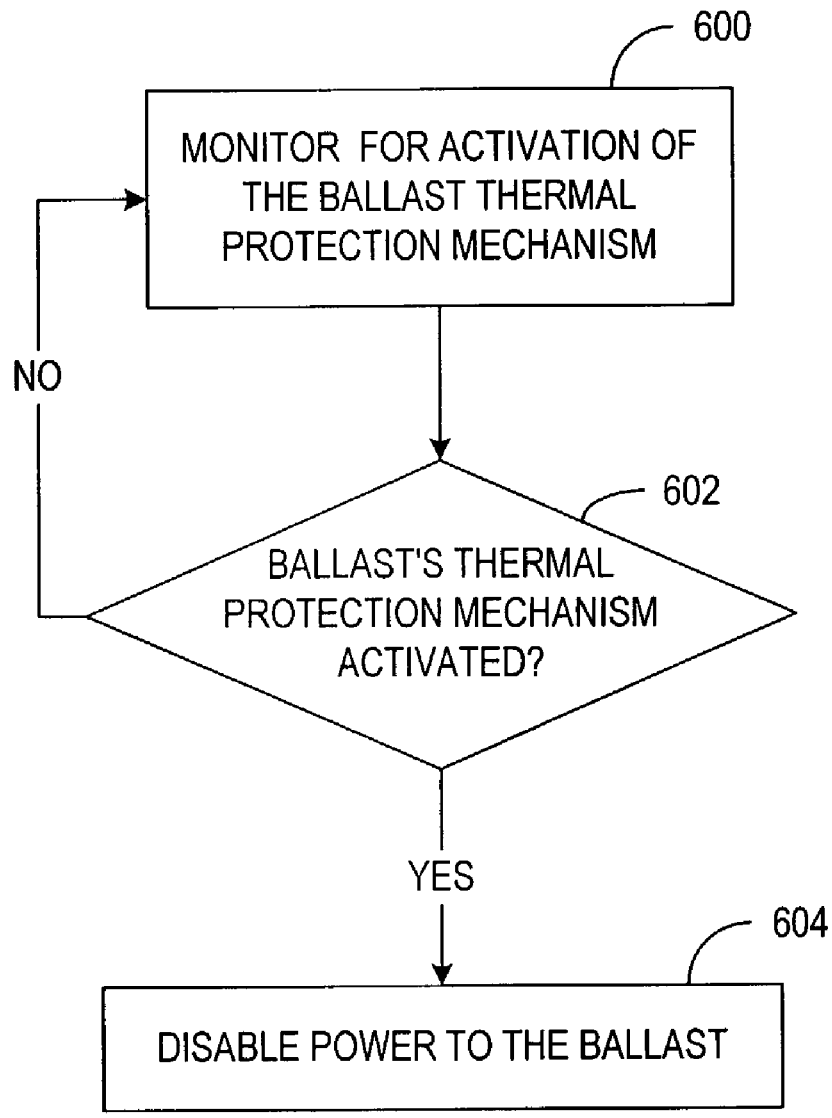
FIGS. 6, 7, and 8 are flow diagram illustrating various embodiments of methods for protecting against the effects of ballast thermal cycling in accordance with the present invention.

FIG. 6 is a flow diagram of one embodiment of a method for protecting against the effects of ballast thermal cycling in accordance with the present invention. One aspect of the present invention contemplates determining whether the ballast thermal protection mechanism has been activated, as illustrated at block 600. A number of different manners of determining this may be implemented. For example, the current through the ballast and/or lamp(s) may be monitored in connection with monitoring the temperature in the vicinity of the ballast. Using this information, it can be determined 602 whether the ballast's thermal protection mechanism has been activated. Other manners of monitoring 600 for activation of the thermal protection mechanism may also be employed, including monitoring the thermal protection mechanism itself, or receiving a signal generated by the ballast or other designated circuitry that indicates whether the ballast's thermal protection mechanism has been activated. In any case, it is determined 602 whether the mechanism has been activated. If so, power to the ballast is disabled 604. More particularly, the power supplying the ballast is disconnected from the ballast, so that the ballast cannot conduct current to the lamp(s) at all until subsequently allowed to do so. Disabling the power can be performed in a number of ways, including but not limited to opening a relay or other switch in series between the power source and the ballast, deactivating an enable signal to the ballast where the ballast is equipped with such functionality, or powering down the power source completely (e.g., in the case of a controllable power source such as a controllable AC generator). Using a method such as illustrated in FIG. 6, repeated lamp start-ups that reduces lamp life is prevented by temporarily disabling power to the ballast during times in which the ballast is likely to experience thermal cycling.

Figure 7:
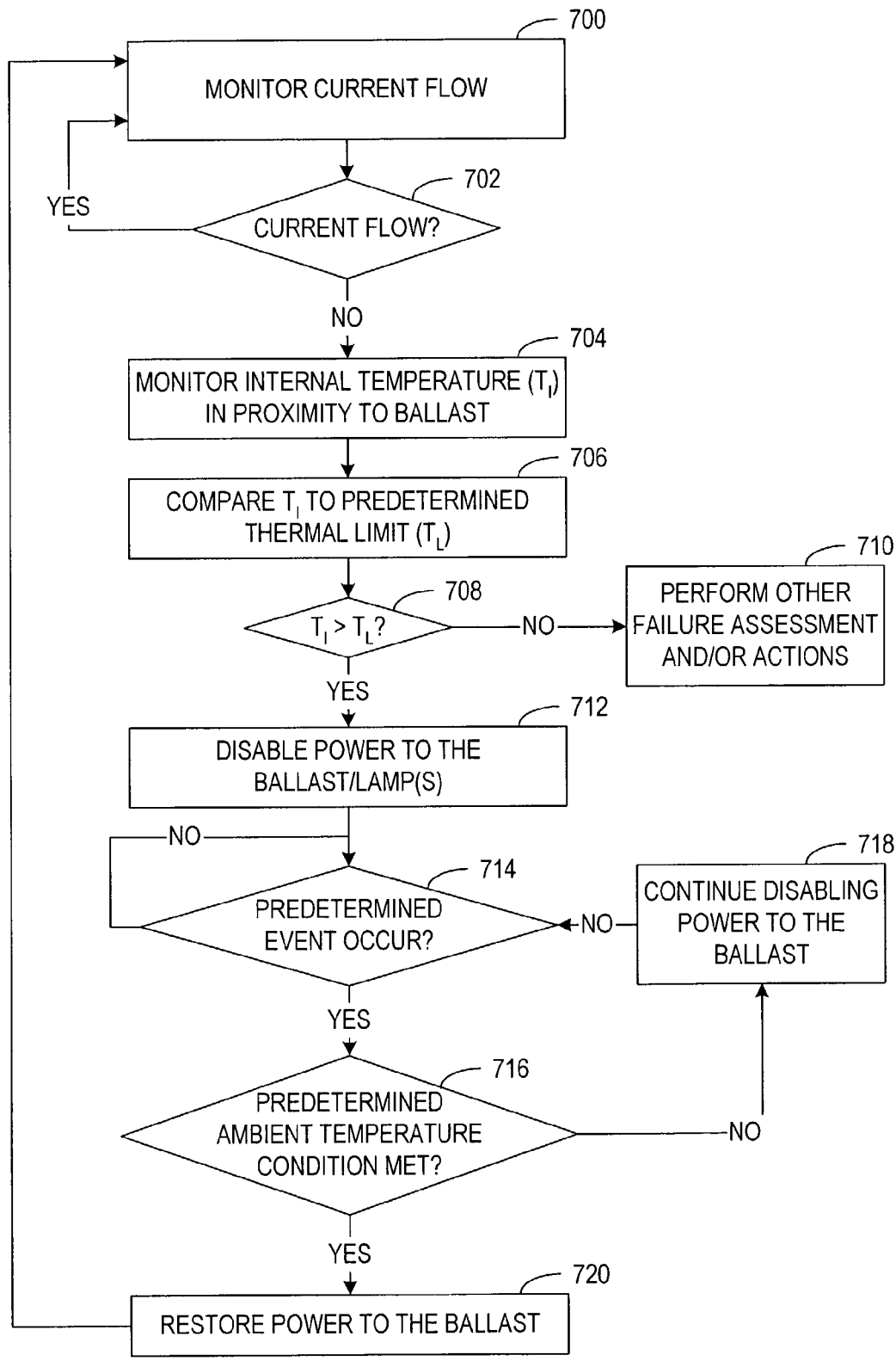

FIG. 7 is a flow diagram of another embodiment of a method for protecting against the effects of ballast thermal cycling in accordance with the present invention. In the illustrated embodiment, current flow is monitored 700. Current flow can be monitored at any desired point in the circuit loop including the ballast, lamp(s), and switch/relay enabling power to the ballast/lamp(s). In one embodiment, current is measured at the input to the ballast. If current is flowing as determined at decision block 702, it is known that the ballast's thermal protection mechanism has not been activated, as otherwise no current would be flowing. If no current is flowing, the internal temperature $T_I$ in proximity to the ballast is monitored 704. In one embodiment, the internal temperature $T_I$ corresponds to a combination of the external ambient temperature plus the heat generated by the ballast when the lamps are on. The internal temperature $T_I$ is compared 706 to a predetermined thermal limit $T_L$. If $T_I$ is less than $T_L$, then it is assumed that the reason for the lack of current flow is unrelated to the ballast's thermal protection mechanism, and other failure assessment and/or actions may optionally be performed 710.

If $T_I$ is greater than $T_L$, power to the ballast and lamp(s) is disabled 712, such as by opening a switch that allows power to be supplied to the ballast. Power will be disabled until a predetermined event occurs, as determined at decision block 714. The predetermined "event" may include any conceivable event, including expiration of a predetermined time duration, expiration of a count as executed on a counter, recognition of a time of day (including date and/or time), recognition of an event relating to the possible cooling of the ballast and/or ambient temperature proximate the ballast (e.g., a signal indicating that a fan, air conditioning unit, or other cooling device has been started which will reduce the temperature), etc. When the predetermined event occurs as determined at decision block 714, it is optionally determined 716 whether a predetermined ambient temperature condition is met. For example, the predetermined ambient temperature condition may be that the internal temperature $T_I$ must drop by a predetermined quantity (e.g., drop 15 degrees relative to its initial cutout temperature) or alternatively drop to a predetermined temperature level (e.g., drop to 150 degrees). As another example, the internal temperature $T_I$ may simply be required to drop below the predetermined thermal limit $T_L$. Any number of options are possible, and the present invention contemplates any such option.

If the predetermined ambient temperature condition has not been met as determined at decision block 716, power to the ballast continues to be disabled as shown at block 718. It is then again determined 714 whether a predetermined event occurs, where this predetermined event may be the same or a different predetermined event as was used in the previous analysis. For example, the predetermined event associated with decision block 714 may represent a three hour time duration the first time that power is disabled 712, and may represent a one hour time duration on subsequent tests of the predetermined ambient temperature conditions. When the predetermined ambient temperature condition is met as determined at decision block 716, power is restored 720 to the ballast, and lamp operation is thereby permitted.

Figure 8:
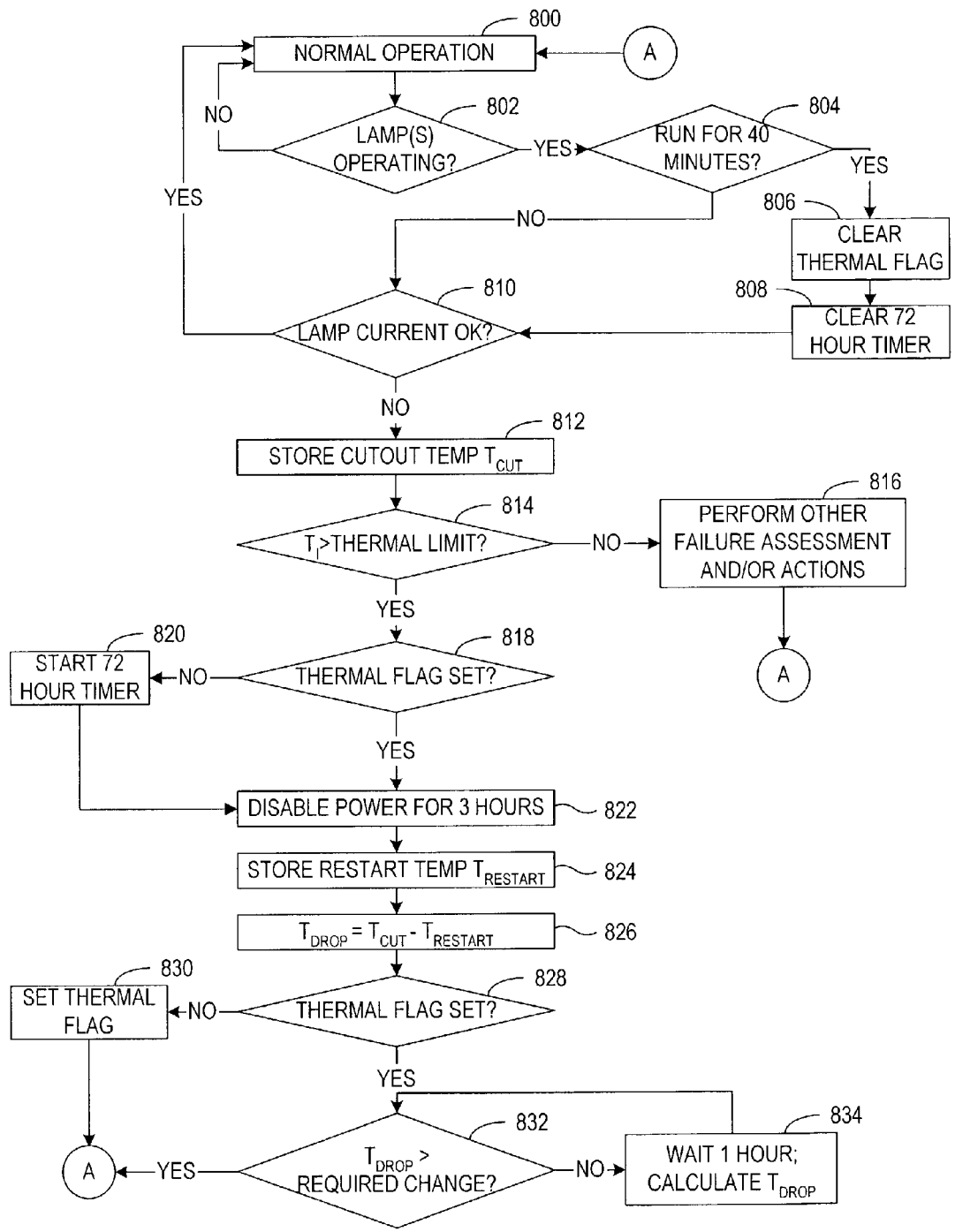

FIG. 8 is a flow diagram of a more particular embodiment of a method for protecting against the effects of ballast thermal cycling in accordance with the present invention. Normal operation 800 begins, and it is determined 802 whether the lamp(s) are operating. As previously described in connection with FIG. 2, lamps are deemed to be "on" or "running" after an initial setup time, such as five seconds, ten seconds, forty seconds, or any desired setup time. If the lamps are operating, it is determined 804 whether the lamps have been operating for a predetermined time, such as forty minutes in the illustrated example. This time duration check is used after lamps have been restarted after a thermal cycle protection operation has already occurred. This is described more thoroughly below.

If the lamps have been running for the predetermined time, a thermal flag is cleared 806, and an extended lamp status flag is cleared 808. The extended lamp status flag corresponds to whether a particular timer has been initiated for an extended lamp operation. In one embodiment, the extended lamp status corresponds to whether or not the lamps have run longer than a predetermined time (40 minutes in the illustrated embodiment) at any time over a 72-hour period. If this is the case as determined at decision block 804, the 72-hour timer is cleared to reset this timer. It is then determined 810 whether the lamp current is properly flowing. It is noted that proper flow of lamp current may be determined by monitoring the lamp current or the ballast current, as current through the ballast indicates that current is flowing through the lamp. If lamp current is properly flowing, normal operation 800 continues.

If it is determined 810 that lamp current is not flowing, the cutout temperature $T_{CUT}$ stored 812. The cutout temperature corresponds to the internal temperature at the time that it was determined 810 that lamp current was not flowing. As previously described, the internal temperature $T_I$ corresponds to the temperature in proximity to the ballast, and includes the external ambient temperature plus the increase in temperature generated by the ballast when conducting current through the lamps. If the internal temperature $T_I$ is not greater than a predetermined thermal limit as determined at decision block 814, then it is assumed that the reason for the lack of current flow is unrelated to the ballast's thermal protection mechanism, and other failure assessment and/or actions may optionally be performed 816.

If, on the other hand, it is determined 814 that the internal temperature $T_I$ is greater than the predetermined thermal limit, it is determined 818 whether the thermal flag is set. If this is the first time through the process since the thermal flag was cleared 806, then this indicates that the 72-hour timer has not yet been set since it was cleared 808 when the thermal flag 806 was cleared. In this case, the 72-hour timer is started 820. Whether or not the thermal flag is determined to be set at decision block 818, power is disabled 822 for a predetermined time period or until some predetermined event occurs. In the illustrated embodiment, the predetermined time period is a three-hour period for which the power is disabled. This disabling of power for the predetermined time period is conducted in anticipation of a decreasing ambient temperature in the vicinity of the ballast. The restart temperature $T_{RESTART}$ at which the restart is attempted three hours later is stored 824, and the temperature drop $T_{DROP}$ is calculated 826. In one embodiment, the temperature drop $T_{DROP}$ is calculated as the cutout temperature $T_{CUT}$ minus the restart temperature $T_{RESTART}$. This calculation therefore determines the amount by which the internal temperature has dropped in the three-hour period.

At this point, it is again determined 828 whether the thermal flag is set. It would not be set, for example, if it had not been previously set and the 72-hour timer had been started 820 prior to the three-hour time period in which power had been disabled. Where the thermal flag has not yet been set as determined at decision block 828, it is set 830, and normal operation 800 resumes. It is noted that if the lamps do not run for 40 minutes (or other predetermined time) as determined at decision block 804, neither the thermal flag nor the 72-hour (or other predetermined time) timer will be cleared 806, 808. In such a case, the next time the thermal flag is checked at decision block 818, the 72-hour timer will not be started 820, as it will already be in progress.

If the thermal flag is determined to be set at decision block 828, it is then determined 832 whether the temperature drop $T_{DROP}$ is greater than a predetermined required change. If so, then the predetermined ambient temperature condition has been met, and normal operation 800 resumes. On the other hand, if it is determined 832 that the temperature drop $T_{DROP}$ is not greater than the required change, power will not be restored at this time, and the temperature drop $T_{DROP}$ is again calculated after another predetermined time period (e.g., one hour) as illustrated at block 834. In one embodiment of the invention, this $T_{DROP}$ calculation after the predetermined time period can continue until it is determined 832 that the temperature drop $T_{DROP}$ is greater than the required change. In another embodiment, the $T_{DROP}$ calculation after the predetermined time period can be performed a predetermined number of times, such as once, at which time normal operation 800 can resume where power is restored, with the caveat that power to the lamps may quickly be shut off again if the internal temperature has not decreased to a sufficient level.

In another embodiment, if the new power on time proved to be relatively short (compared to a predetermined time), the temperature required for return to normal operation can be adjusted. More particularly, the predetermined required temperature change used in the determination 832 of whether the temperature drop $T_{DROP}$ is greater than the predetermined required change may be increased in increments until some limit is reached, in hope of attaining a continuous number of minutes (e.g., 40 minutes) of runtime with proper drop in internal temperature.

Figure 9:
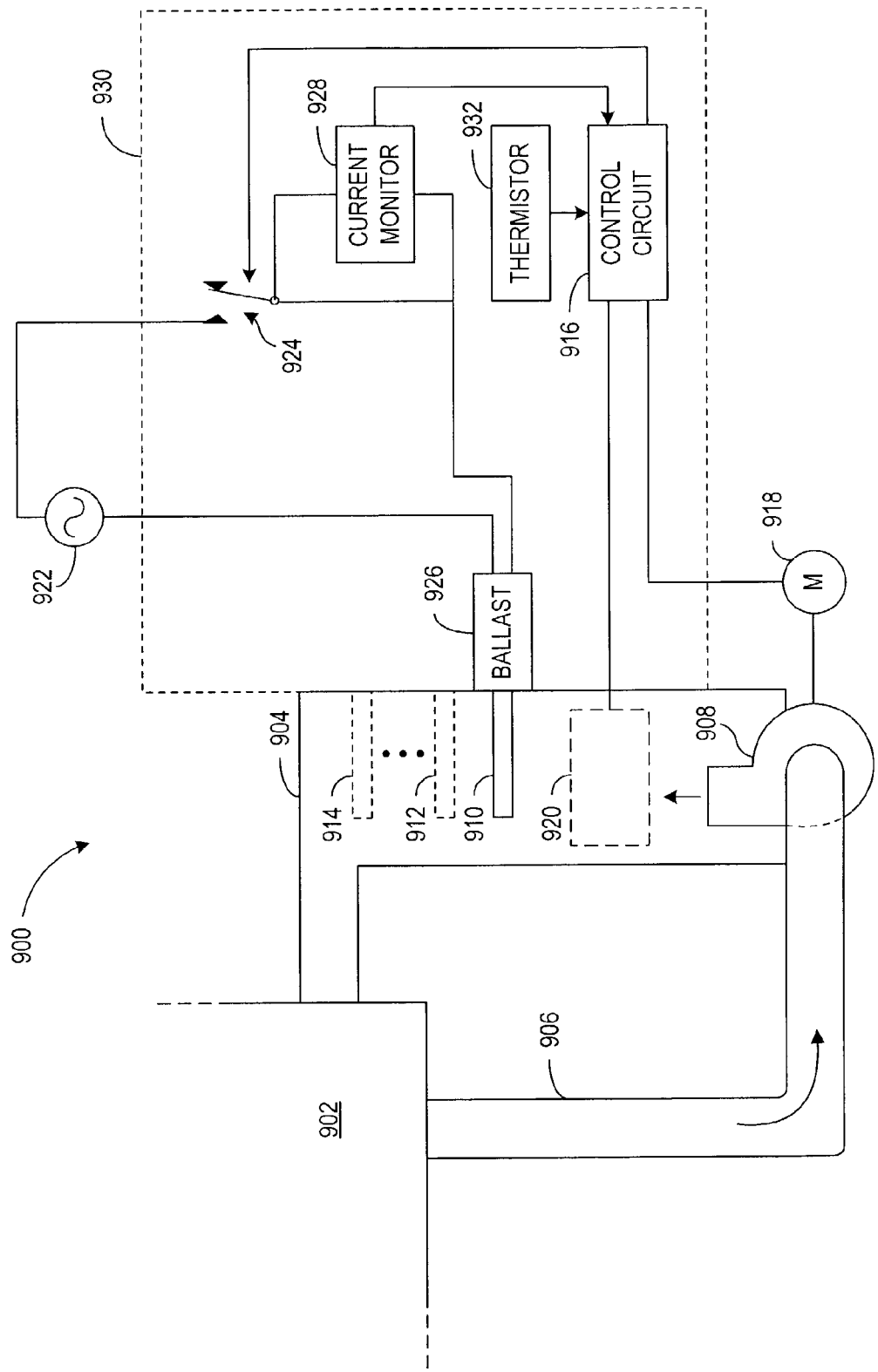
FIG. 9 is a block diagram illustrating one embodiment of the present invention as used in an air handling system.

FIG. 9 is a block diagram illustrating one embodiment of the present invention as used in an air handling system. In this representative example, a UV air handling system 900 is used to circulate air, possibly heated or cooled air, within the area 902. The air handling system 900 generally circulates air throughout the area 902 by employing a duct system. The duct system includes, for example, a plenum and associated ductwork 904 to provide air to the area 902, and one or more return air ducts 906. The blower 908 is in fluid communication with the return air duct 906 and the source air duct 904, to draw air from the area 902 via the return air duct 906 and provide air to the area 902 via the source air duct 904. The source air duct 904 may divide into a plurality of individual ducts having outlets at various locations within the area 902. Similarly, a plurality of return air inlets and corresponding ducts may be used within the area 902, which aggregate into the return air duct 906.

One or more UV lamps operating as a germicide to kill airborne bacteria and surface mold in the air handling system may be positioned within the source air ductwork 904 as depicted in FIG. 9, or alternatively (or additionally) may be positioned within the return air ductwork 906. Various numbers of UV lamps may be provided, as depicted by UV lamps 910, 912, through 914. The number and position of UV lamps depends on a number of factors, including the size and wattage of the lamps, size of the area 902 and/or ductwork, desired level of germicide protection, etc. Power to these one or more UV lamps 910, 912, 914 can be controlled in accordance with the principles of the present invention. For ease of description, the following description is described in terms of a single UV lamp 910, although the principles described herein are equally applicable to multiple UV lamps.

A control circuit 916 may be used to control various components of the air handling system, such as to control a motor 918 for the blower 908, to control a heat exchanger 920, cooling components (not shown), and the like. The control circuit 916 may also be used to automatically control power to the UV lamp 910 during periods of potential ballast thermal cycling, in a manner analogous to that described in connection with FIGS. 1–8. More particularly, the UV lamp 910 is powered by an AC voltage source 922 through the switch 924 and the ballast 926. A current monitor circuit 928 is used in connection with the control circuit 916 to provide protection from premature UV lamp 910 mortality. In one embodiment of the invention, the current monitor circuit 928 monitors current from a 120 VAC power source 922 at the input of the ballast 926. When the ballast 926 is on and the UV lamp 910 is operating, current flows between the filaments and through the gas of the UV lamp 910. If current through the lamps has been terminated due to the ballast's thermal protection mechanism triggering, this can be detected by the current monitor 928. Therefore, in accordance with one embodiment of the invention, the AC current at the ballast 926 is monitored by the current monitor circuit 928 when the switch 924 is closed to provide power to the ballast 926 and UV lamp 910.

In accordance with one embodiment of the present invention, the internal temperature of the housing in which the ballast 926 resides is monitored. As previously described, the internal temperature may be used in conjunction with the state of current flow to deduce whether the ballast thermal protection mechanism has caused the current to stop flowing and consequently the lamps to turn off. FIG. 9 illustrates an example of such a housing 930, depicted by dashed lines. The temperature within the housing is monitored by a temperature sensor(s), such as the thermistor 932. The thermistor 932 may be placed at any location within the housing, but is preferably positioned proximate the ballast 926. For example, in one embodiment, the thermistor 932 is placed very near, but not touching, the ballast 926. This allows for monitoring of the ambient temperature surrounding the ballast 926 to be monitored, but does not monitor the ballast temperature itself as it is not in direct contact with the ballast 926. However, because the temperature within the housing 930 will likely be substantially the same throughout the housing 930, the thermistor 932 may be positioned anywhere within the housing 930 in accordance with one embodiment of the invention.

The control circuit 916 is coupled to the current monitor 928 to receive one or more current monitor signals from the current 928, and is also coupled to the thermistor 932 to receive signals corresponding to the temperature within the housing 930. The control circuit 916 processes this information accordingly, to determine whether the ballast thermal protection mechanism caused the lamps to turn off. If current is not flowing through the UV lamp 910, and the temperature is above a predetermined thermal limit, the control circuit 916 can provide switch control signals to the switch 924 to temporarily remove power to the ballast 926 and consequently the UV lamp 910. Temporary removal of power from the lamp 910 prevents repeated arcing between the filaments of the UV lamp 910, that is due to repeated lamp start-ups as a result of ballast thermal cycling, which ultimately prevents premature lamp mortality.

After a desired time or in connection with a desired event, the control circuit 916 can again turn on switch 924, thereby restoring power to the UV lamp 910. The current through the UV lamp 910 is again monitored by the current monitor 928 to determine whether current is flowing through the lamp 910, and the internal housing temperature is again monitored via the thermistor 932. This cycle of monitoring, removing power to the UV lamp 910, restoring power to the UV lamp 910, and repeated monitoring of the UV lamp 910 current and internal temperature can be performed a predetermined number of times, for a predetermined time duration, or until a predetermined event(s) occurs. Where the lamps were turned off by the thermal protection mechanism of the ballast 926, normal current flow in the lamp 910 should resume when the internal temperature decreases to an appropriate level.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for preventing thermal cycling of a ballast coupled to one or more lamps, the method comprising:
   monitoring for activation of the ballast's thermal protection mechanism; and
   disabling power to the ballast when the ballast's thermal protection mechanism has been activated.

2. The method of claim 1, wherein monitoring for ballast thermal protection activation comprises:
   determining whether current is flowing through at least one of the ballast or the lamps;
   monitoring an ambient temperature proximate the ballast; and
   comparing the ambient temperature to a predetermined temperature threshold.

3. The method of claim 2, further comprising designating the ballast's thermal protection mechanism activated when it is determined that current is not flowing through the ballast or the lamps, and when the ambient temperature is greater than the predetermined temperature threshold.

4. The method of claim 2, wherein monitoring the ambient temperature proximate the ballast comprises monitoring the ambient temperature using a temperature sensor positioned within a housing that also houses the ballast.

5. The method of claim 2, wherein determining whether current is flowing through at least one of the ballast or the lamps comprises measuring the flow of current through the ballast or the lamps via an in-series electronic current meter.

6. The method of claim 2, wherein disabling power to the ballast comprises disabling power to the ballast until an occurrence of at least one predetermined event.

7. The method of claim 6, further comprising subsequently monitoring the ambient temperature proximate the ballast in response to the occurrence of the at least one predetermined event, and continuing disabling of the power to the ballast if the ambient temperature is still greater than the predetermined temperature threshold.

8. The method of claim 6, further comprising subsequently monitoring the ambient temperature proximate the ballast in response to the occurrence of at least one predetermined event, and continuing disabling of the power to the ballast if the ambient temperature has not decreased by a predetermined amount.

9. The method of claim 6, further comprising subsequently monitoring the ambient temperature proximate the ballast in response to the occurrence of the at least one predetermined event, and restoring power to the ballast if the ambient temperature is no longer greater than the predetermined temperature threshold.

10. The method of claim 6, further comprising subsequently monitoring the ambient temperature proximate the ballast in response to the occurrence of the at least one predetermined event, and restoring power to the ballast if the ambient temperature has decreased by a predetermined amount.

11. The method of claim 6, further comprising:
    repeatedly monitoring the ambient temperature proximate the ballast in response to repeated occurrences of one or more second predetermined events;
    restoring power to the ballast if the ambient temperature corresponds to a predetermined ambient temperature condition in response to any of the occurrences of the second predetermined events; and
    continuing disabling of the power to the ballast if the ambient temperature fails to correspond to the predetermined ambient temperature condition in response to any of the occurrences of the second predetermined events.

12. The method of claim 11, further comprising transmitting an error message where the temperature fails to correspond to the predetermined ambient temperature over a predetermined time.

13. The method of claim 11, further comprising transmitting an error message where the temperature fails to correspond to the predetermined ambient temperature after a predetermined number of attempts.

14. The method of claim 1, wherein disabling power to the ballast comprises disabling power to the ballast until an occurrence of at least one predetermined event.

15. The method of claim 14, wherein the predetermined event comprises expiration of a predetermined time duration.

16. The method of claim 14, wherein the predetermined event comprises expiration of a predetermined count value.

17. The method of claim 14, wherein the predetermined event comprises a time of day.

18. The method of claim 14, wherein the predetermined event comprises initiation of a ballast cooling function.

19. The method of claim 14, further comprising enabling power to the ballast in response to the occurrence of the at least one predetermined event.

20. The method of claim 1, wherein disabling power to the ballast comprises opening a switch in series between a power source and the ballast.

21. The method of claim 1, wherein the ballast includes a power enable input to receive a power enable signal indicating whether the ballast is to provide an open circuit or closed circuit to the lamps, and wherein disabling power to the ballast comprises deactivating the power enable signal to direct the ballast to provide an open circuit to the lamps.

22. The method of claim 1, wherein disabling power to the ballast comprises:
    disabling power to the ballast until occurrence of a first predetermined event;
    upon occurrence of the first predetermined event, determining whether an ambient temperature proximate the ballast has decreased by a predetermined amount; and
    if the ambient temperature proximate the ballast has not decreased by the predetermined amount, continuing disabling power to the ballast until occurrence of a second predetermined event.

23. The method of claim 1, wherein monitoring for activation of the ballast's thermal protection mechanism comprises monitoring for a signal generated by the ballast in response to the ballast's thermal protection mechanism being activated.

24. The method of claim 1, wherein monitoring for activation of the ballast's thermal protection mechanism comprises monitoring the ballast's thermal protection mechanism itself to determine when the ballast's thermal protection mechanism has been activated.

25. A control system for preventing thermal cycling of a ballast coupled to at least one lamp, the ballast including a thermal protection mechanism to disable power to the lamp while the thermal protection mechanism is activated, the control system comprising:
    a current monitor coupled to monitor current flow through the ballast to the lamp, and to provide an indication of a state of the current flow;
    at least one temperature sensor positioned within a predetermined vicinity of the ballast to measure an ambient temperature proximate the ballast; and
    a controller coupled to the current monitor and the temperature sensor to determine whether the ballast's thermal protection mechanism is activated based on the indication of the state of current flow and the ambient temperature, and to disable power to the ballast when it is determined that the ballast's thermal protection mechanism is activated.

26. The control system as in claim 25, wherein the controller comprises a data processing module configured to compare the ambient temperature to a predetermined temperature threshold, and to determine when the ballast's thermal protection mechanism is activated by determining when the indication of the state of current flow indicates a lack of current flow and the ambient temperature is greater than the predetermined temperature threshold.

27. The control system as in claim 25, further comprising a controllable switch circuit coupled in a circuit path providing the power to the ballast and the lamp, wherein the controller disables power to the ballast by providing a power disable signal to the controllable switch circuit to open the circuit path when it is determined that the ballast's thermal protection mechanism is activated.

28. The control system as in claim 27, wherein the controllable switch circuit comprises a relay coupled between the ballast and a power source providing the power.

29. The control system as in claim 27, wherein the ballast includes the controllable switch circuit, and a power control input coupled to the controllable switch circuit to receive the power disable signal to open the circuit path at the ballast when it is determined that the ballast's thermal protection mechanism is activated.

30. The control system as in claim 25, wherein the controller comprises at least one timer, wherein the controller is configured to restore power to the ballast upon expiration of the timer.

31. The control system as in claim 25, wherein the controller comprises at least one timer, and wherein the controller is configured to determine whether an ambient temperature condition is met upon expiration of the timer.

32. The control system as in claim 31, wherein the controller is configured to maintain disabling power to the ballast if the ambient temperature condition is not met.

33. The control system as in claim 32, wherein the controller comprises a second timer, and wherein the controller is configured to restore power to the ballast upon expiration of the second timer.

34. The control system as in claim 32, wherein the controller comprises a second timer, and wherein the controller is configured to determine whether the ambient temperature condition is met upon expiration of the second timer.

35. The control system as in claim 31, wherein the controller is configured to restore power to the ballast if the ambient temperature condition is met.

36. The control system as in claim 31, wherein the ambient temperature condition comprises at least one of a predetermined ambient temperature and a predetermined decrease of ambient temperature.

37. The control system as in claim 25, wherein the monitor circuit comprises an electronic current meter coupled to monitor the current through at least one of the ballast and the lamp, and to generate the indication of the state of the current flow in response thereto.

38. An ultraviolet (UV) air treatment system for treating air provided by an air handling system having an air duct arrangement for channeling the air through a targeted space, the UV air treatment system comprising:
    at least one UV lamp positionable within the air duct arrangement;
    a ballast coupled between a power source and the UV lamp, wherein the ballast includes a thermal protection mechanism to disable power to the lamp while the thermal protection mechanism is activated;
    a current monitor coupled to monitor current flow through the ballast to the UV lamp, and to provide an indication of a state of the current flow;
    at least one temperature sensor positioned within a predetermined vicinity of the ballast to measure an ambient temperature proximate the ballast; and
    a controller coupled to the current monitor and the temperature sensor to determine whether the ballast's thermal protection mechanism is activated based on the indication of the state of current flow and the ambient temperature, and to disable power to the ballast when it is determined that the ballast's thermal protection mechanism is activated.

39. The UV air treatment system as in claim 38, wherein the controller comprises a data processing module configured to compare the ambient temperature to a predetermined temperature threshold, and to determine when the ballast's thermal protection mechanism is activated by determining when the indication of the state of current flow indicates a lack of current flow and the ambient temperature is greater than the predetermined temperature threshold.

40. The UV air treatment system as in claim 38, further comprising a controllable switch coupled in a circuit path including at least the power source, the ballast, and the UV lamp, wherein the controller disables power to the ballast by providing a power disable signal to the controllable switch to open the circuit path when it is determined that the ballast's thermal protection mechanism is activated.

41. The UV air treatment system as in claim 38, wherein the air duct arrangement comprises at least a supply air duct and a return air duct, and wherein the at least one UV lamp is positionable within the supply air duct.

42. The UV air treatment system as in claim 38, wherein the controller comprises at least one timer, and wherein the controller is configured to determine whether an ambient temperature condition is met upon expiration of the timer.

43. The UV air treatment system as in claim 42, wherein the controller is configured to maintain disabling power to the ballast if the ambient temperature condition is not met, and to restore power to the ballast if the ambient temperature condition is met.

\* \* \* \* \*